H. RICHMANN.
Improvement in Steam-Traps.
No. 131,707.
Patented Sep. 24, 1872.
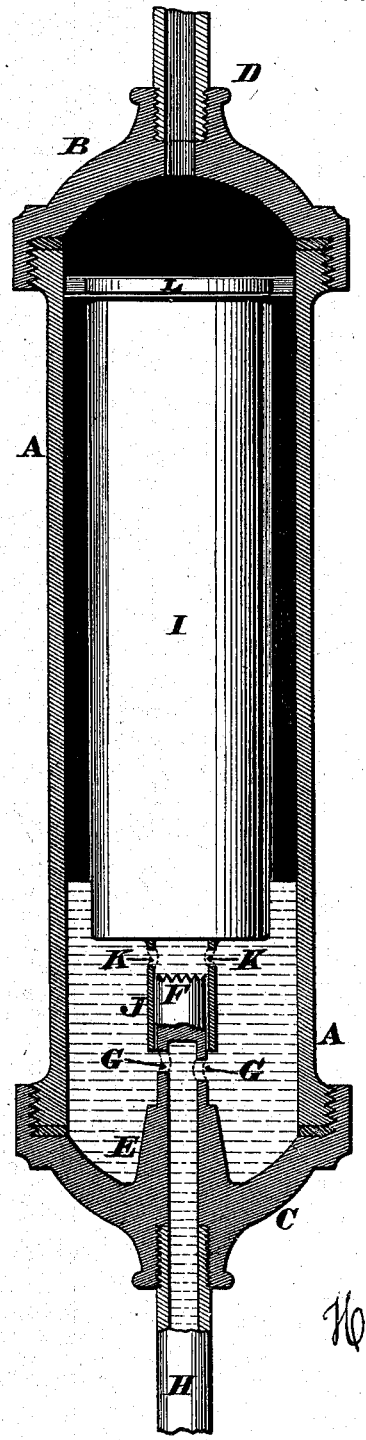

UNITED STATES PATENT OFFICE.

HENRY RICHMANN, OF CINCINNATI, OHIO.

IMPROVEMENT IN STEAM-TRAPS.

Specification forming part of Letters Patent No. 131,707, dated September 24, 1872.

*To all whom it may concern:*

Be it known that I, HENRY RICHMANN, of Cincinnati, Hamilton county, Ohio, have invented an Improvement in Steam-Traps, of which the following is a specification:

Nature and Objects of the Invention.

My invention relates to a provision for the automatic release of water of condensation from steam-heating coils or radiators. This object I effect by employing the floatative power of the accumulated water upon a closed vessel or float to which the discharge-valve is attached.

The accompanying drawing is an axial section of a trap embodying my invention, the float and portions of the discharge-pipe being in elevation.

A is a chamber, which may have the represented cylindrical form and have its ends closed by screw-caps B C, of which the upper cap B communicates by neck D with the lowest part of the coil or radiator, and of which the lower cap C has a stand-pipe, E, closed and channeled at its upper end F, a short distance below which it is perforated, G. Screwed into the lower end of pipe E and communicating freely with it is the water-discharge pipe H. I is a float, consisting of a hollow cylinder of copper closed at both ends and filled with air. Projecting from the bottom of I is a short tube, J, open at its lower end and fitting snugly around the stand-pipe E, so as, in the depressed position of the float, to close the perforations G. The tube J has small orifices K near its upper part. L is a stop to limit the ascent of the float.

Operation.

Whenever the condensations in the chamber A reach a level where their displaced portions outweigh the float, the latter, in accordance with a familiar law in hydrostatics, rises, exposing the apertures G, and permitting the surplus water to escape, which, in turn, being followed by a subsidence of the water in the chamber, the float descends and closes the apertures G until another rise. The small orifices K and channels F permit a free entrance and exit of water above the stand-pipe in order that the movements of the float may not be obstructed by atmospheric pressure in ascending, nor by imprisoned water in descending.

Claim.

I claim as new and of my invention—

The chamber A, perforated stand-pipe E, float I, and perforated tube J, arranged as described, for the purpose set forth.

In testimony of which invention I hereunto set my hand.

HENRY RICHMANN.

Attest:
  GEO. H. KNIGHT,
  JAMES H. LAYMAN.